US011033110B2

(12) United States Patent
Schellenberg

(10) Patent No.: US 11,033,110 B2
(45) Date of Patent: Jun. 15, 2021

(54) CHAIR CADDIE

(71) Applicant: Comfor Tek Seating Inc., Lethbridge (CA)

(72) Inventor: Randy Dwayne Schellenberg, Coaldale (CA)

(73) Assignee: Comfor Tek Seating Inc., Ottawa (CA)

(*) Notice: Subject to any disclaimer, the term of this patent is extended or adjusted under 35 U.S.C. 154(b) by 327 days.

(21) Appl. No.: 15/996,068

(22) Filed: Jun. 1, 2018

(65) Prior Publication Data
US 2019/0365105 A1    Dec. 5, 2019

(51) Int. Cl.
*A47C 7/62* (2006.01)
*A47C 7/00* (2006.01)
*B62B 5/00* (2006.01)
*B62B 5/04* (2006.01)

(52) U.S. Cl.
CPC ............... *A47C 7/006* (2013.01); *A47C 7/62* (2013.01); *B62B 5/0083* (2013.01); *B62B 5/0093* (2013.01); *B62B 5/0461* (2013.01); *B62B 2202/32* (2013.01); *B62B 2206/02* (2013.01)

(58) Field of Classification Search
CPC ....... B62B 3/02; B62B 5/0083; B62B 5/0093; B62B 2202/30; B62B 2202/32; B62B 2202/34; B62B 2203/60; B62B 2206/02; B62B 2206/04
See application file for complete search history.

(56) References Cited

U.S. PATENT DOCUMENTS

| 115,779 | A | * | 6/1871 | Stafford | ................ | B62B 5/0083 |
| | | | | | | 280/35 |
| 123,756 | A | * | 2/1872 | Woodruff | .............. | B62B 5/0083 |
| | | | | | | 280/35 |
| 211,828 | A | * | 2/1879 | Ash | ........................ | B62B 5/0083 |
| | | | | | | 280/35 |

(Continued)

FOREIGN PATENT DOCUMENTS

DE        3515301 C1    7/1986
DE    102013016343 A1    4/2015
(Continued)

OTHER PUBLICATIONS

Kelly Rest Brand Products, Adjustable CPU Stand-Black, 2017, page from website (http://www.kellyrest.com/).
(Continued)

*Primary Examiner* — Emma K Frick
(74) *Attorney, Agent, or Firm* — Offit Kurman, P.A.; Steven Scott Lloyd

(57) ABSTRACT

A chair caddie, comprises a central hub and four arms. Each of the four arms is coupled to and extends outwardly from the central hub and is adapted to support a chair leg. Each arm is supported by a surface-engaging roller. The surface-engaging rollers cooperate to elevate the arms and the central hub above a planar surface engaged by the surface-engaging rollers. Each arm carries a chair foot receptacle adapted to receive and support a chair foot, and each roller is positioned inboard of the chair foot receptacle on its respective arm. The chair foot receptacles define a notional chair footprint circumscribing the chair foot receptacles, and the surface-engaging rollers have centers of rotation that are inside the chair footprint.

7 Claims, 13 Drawing Sheets

(56) References Cited

U.S. PATENT DOCUMENTS

| | | | | |
|---|---|---|---|---|
| 241,809 | A * | 5/1881 | Long | B62B 5/0083 280/35 |
| 525,298 | A * | 8/1894 | Thiele | B62B 5/0083 280/35 |
| 695,368 | A * | 3/1902 | Bigelow | B62B 5/0083 280/35 |
| 1,173,517 | A * | 2/1916 | Hosick | B62B 5/0083 280/35 |
| 1,189,053 | A * | 6/1916 | Buchanan | B62B 5/0083 280/79.11 |
| 1,350,963 | A * | 8/1920 | Fowler | B62B 3/02 248/172 |
| 1,743,904 | A * | 1/1930 | William | B62B 5/0083 280/35 |
| 1,853,318 | A * | 4/1932 | Peters | B62B 5/0083 280/35 |
| 1,887,067 | A * | 11/1932 | Sven | B62B 5/0083 280/35 |
| 2,003,162 | A * | 5/1935 | Ulmer | B62B 3/02 280/35 |
| 2,556,947 | A * | 6/1951 | Smith | B62B 3/10 280/35 |
| 2,558,144 | A * | 6/1951 | McComie | A61G 5/00 280/35 |
| 2,763,491 | A * | 9/1956 | Shafer, Jr. | F24C 15/086 280/35 |
| 2,961,250 | A | 11/1960 | Beach | |
| 3,288,479 | A * | 11/1966 | Ullman | B62B 5/0083 280/35 |
| 3,329,442 | A * | 7/1967 | Di Vietri | B62B 5/0083 280/35 |
| 3,802,524 | A * | 4/1974 | Seidel | A61G 5/042 180/6.5 |
| 3,831,960 | A | 8/1974 | Durigan | |
| 3,945,449 | A | 3/1976 | Ostrow | |
| D269,216 | S | 5/1983 | Greenheck | |
| 4,801,152 | A * | 1/1989 | Elliott | B60B 33/00 114/344 |
| 5,205,571 | A | 4/1993 | Geier et al. | |
| D340,563 | S | 10/1993 | Kean et al. | |
| 5,599,031 | A * | 2/1997 | Hodges | B62B 5/0083 280/35 |
| 5,899,422 | A | 5/1999 | Eke | |
| 6,095,533 | A * | 8/2000 | Balolia | B60T 1/14 188/19 |
| 6,371,496 | B1 * | 4/2002 | Balolia | B60T 1/14 188/19 |
| 6,499,163 | B1 | 12/2002 | Stensby | |
| 6,601,865 | B1 | 8/2003 | Sebert | |
| 6,964,423 | B1 | 11/2005 | Chieh et al. | |
| 7,163,214 | B1 * | 1/2007 | Bratton, Sr. | A63D 15/00 280/79.11 |
| 7,213,820 | B2 * | 5/2007 | Drummond | B60B 33/0005 280/47.34 |
| 7,287,766 | B2 * | 10/2007 | Kilday | B62B 5/0083 280/35 |
| 7,487,981 | B2 * | 2/2009 | Cromie | B65D 19/42 280/35 |
| 7,988,161 | B2 | 8/2011 | Kilday | |
| 8,011,724 | B2 | 9/2011 | Clayton | |
| 8,205,841 | B2 | 6/2012 | Wood | |
| 8,684,372 | B2 | 4/2014 | Buttazoni et al. | |
| D709,687 | S | 7/2014 | Haydon et al. | |
| 9,061,694 | B2 * | 6/2015 | Emmerich | B62B 5/00 |
| 9,340,222 | B2 | 5/2016 | Bernal et al. | |
| 9,364,093 | B2 * | 6/2016 | Williams | A47C 7/62 |
| 9,421,991 | B2 | 8/2016 | Driessen | |
| 9,456,941 | B2 * | 10/2016 | Mizrachi | A61G 5/00 |
| 9,784,453 | B2 * | 10/2017 | Hall | F24C 3/14 |
| 2002/0144846 | A1 * | 10/2002 | Darby | A61G 5/00 180/65.1 |
| 2004/0173996 | A1 * | 9/2004 | Anderson | B62B 5/0083 280/651 |
| 2004/0188483 | A1 * | 9/2004 | Kato | A45C 5/143 224/576 |
| 2007/0102599 | A1 * | 5/2007 | Lin | B62B 5/049 248/129 |
| 2007/0228681 | A1 | 10/2007 | Schenker | |
| 2012/0306255 | A1 | 12/2012 | Brenner | |
| 2015/0028643 | A1 | 1/2015 | Reborse | |

FOREIGN PATENT DOCUMENTS

| | | |
|---|---|---|
| EP | 2710927 61 | 8/2014 |
| GB | 2374528 A | 10/2002 |
| GB | 2465172 B | 11/2012 |
| NL | 1028376 C2 | 11/2006 |
| WO | WO8505020 A1 | 11/1985 |
| WO | WO9961276 A1 | 12/1999 |
| WO | WO2009140732 A1 | 11/2009 |
| WO | WO2015140436 A1 | 9/2015 |

OTHER PUBLICATIONS

NRSHealthcare Co, Morris Chair Raiser, 2016, page from website (https://www.nrshealthcare.co.uk/bedroom-seating-aids/furniture-raisers/morris-chair-raiser).

Morris&Alexander, Chair Raisers, 2018, page from website (https://www.morrisandalexander.com/chair-raiser).

* cited by examiner

CHAIR CADDIE

STATEMENT REGARDING FEDERALLY FUNDED RESEARCH OR DEVELOPMENT

This invention was not made with the support of federal government funds.

BACKGROUND OF THE INVENTION

People are living longer. Current life expectancy reaches well into the eighties, nineties and beyond. When life spans were shorter, many (if not most) people died before they spent any significant amount of their lives facing mobility challenges. Today, periods of limited mobility, whether through illness or simply aging, can represent a significant portion of a person's life.

Given this reality, there is a high demand for mobility options. For example, elderly people using walkers find it difficult to be seated at tables in restaurants, care facilities and private homes. The process of seating a person who has lost the mobility to "scoot" a chair forwards requires family or staff assistance to push or shove them forward to the table. The obvious answer is a wheelchair. It is designed for exactly this purpose . . . it enables a caregiver to move a seated person to the table. Individuals who do not actually require a wheelchair, however, e.g. those who can walk with the aid of a walker, may be resistant to being placed in a wheelchair—they may view the wheelchair as only one step away from the gurney.

There are several chairs on the market which, while not looking like a conventional wheelchair, include integral components that make it easier for staff and family to move a seated person to the table (for example, one such chair is offered by Royal-EZ, having an address at 120 Meadow Lane, Bryan, Ohio 43506). However, these chairs have certain structural requirements relating to the integral mobility components, and as such this type of chair is necessarily offered in a limited number of styles, which may not match the other chairs in the relevant restaurant, care facility or home. Thus, they may be conspicuous as a "mobility chair" and be resisted by some people for the same reason that they would resist a wheelchair. Additionally, because an entire chair must be purchased, this option may be too costly.

Another option is to modify an existing chair, for example by attaching casters or other types of wheels to some or all of the legs. While this may sometimes be effective, it may place the integrity and/or stability of the chair at risk. For centuries, chairs have been designed from the perspective of the "sitter". Design features taken into account include height, width, weight occupancy rating, color, materials, aesthetics, fabrics etc. Each chair is designed to withstand a set of key parameters, and its structure may include stretcher bars, cross bracing, mechanical clips/brackets or wooden doweling/joints. One consideration that is (or at least should be) factored into the design of each chair is the friction (or lack of friction—e.g. when casters are used) created between the flooring and the base of the chair. Any modifications to the friction force can have a direct bearing on the stability and integrity of the chair, and it is not uncommon for a chair manufacturer to provide that a warranty on the chair is voided if casters or other wheels are attached.

Some efforts have been made to provide a rolling caddie that can be placed beneath the chair. This presents a number of challenges:

avoid raising the chair so much that:
 (a) the arms (if any) cannot pass under the table;
 (b) (even with an armless chair) the occupant is too high to comfortably use the table; or
 (c) adversely affecting the center of gravity so as to create a tipping risk;
supporting rather than undermining the structure of the chair as designed by the manufacturer;
avoiding interference with other chairs at the table;
avoiding tripping hazards for others;
avoiding structural modifications to the chair itself (e.g. drilling holes, mounting additional hardware, etc.) which could void a manufacturer's warranty; and
supporting considerable weight, given the increase in obesity rates.

Thus, providing a chair caddie poses considerable challenges.

BRIEF SUMMARY OF THE INVENTION

In one aspect, the present disclosure is directed to a chair caddie comprising a central hub and four arms. Each of the four arms is coupled to and extends outwardly from the central hub and is adapted to support a chair leg. Each arm is supported by a surface-engaging roller, and the surface-engaging rollers cooperate to elevate the arms and the central hub above a planar surface engaged by the surface-engaging rollers. Each arm carries a chair foot receptacle adapted to receive and support a chair foot, and each roller is positioned inboard of the chair foot receptacle on its respective arm. Each chair foot receptacle may include a chair foot confinement.

In some embodiments, the central hub is of fixed dimension and the arms are pivotally coupled to the central hub at fixed pivot positions relative to one another. In such embodiments, each roller may be positioned longitudinally inboard of the chair foot receptacle on its respective arm.

In some embodiments, the central hub is of adjustable dimension so that the arms are coupled to the central hub at positions that can be adjusted relative to one another. In particular embodiments, the central hub comprises four struts, with each strut being of adjustable length and being pivotally coupled to each adjacent strut at respective strut joints so that each strut can pivot relative to each adjacent strut about a respective strut pivot axis, with the strut pivot axes being parallel to one another. Each arm is coupled to the central hub at the strut joints. In some particular implementations, for a first pair of adjacent arms, each roller is positioned longitudinally inboard of the chair foot receptacle on its respective arm and for a second pair of adjacent arms, each roller is positioned laterally inboard of the chair foot receptacle on its respective arm. Each strut joint may be lockable so as to secure the respective struts and arm thereof in fixed pivotal positions relative to one another, and each strut may be lockable at a selected length. Each strut may be incrementally adjustable between a maximum length and a minimum length, or may be infinitely adjustable between a maximum length and a minimum length. The struts may be telescopic.

In some embodiments, each of the surface-engaging rollers has a fixed yaw relative to the respective arm.

In some embodiments, at least two adjacent arms carry respective braking mechanisms coupled to the respective rollers and adapted to be selectively movable between a braking configuration in which the respective braking mechanism inhibits rotation of the respective roller and a non-braking configuration in which the respective braking mechanism permits rotation of the respective roller, relative to the braking configuration. In some particular embodiments, for a first pair of adjacent arms, each of the surface-engaging rollers has a fixed yaw relative to its respective arm, and at least this first pair of adjacent arms carries the braking mechanisms. The braking mechanisms may include an elevated brake actuator. The braking mechanisms may be biased into the braking configuration.

A combination may comprise a chair caddie as described above, and a chair having four chair legs, with each chair leg having a respective chair foot. The chair defines a notional chair footprint circumscribing the chair feet. The chair feet are received in the chair foot receptacles, and the surface-engaging rollers have centers of rotation that are inside the chair footprint. In certain embodiments, the chair foot receptacles are positioned inferiorly of centers of rotation of the surface-engaging rollers.

In another aspect, the present disclosure is directed to a chair caddie comprising a central hub and four arms, with each of the four arms being coupled to and extending outwardly from the central hub and adapted to support a chair leg. Each arm is supported by a surface-engaging roller, and the surface-engaging rollers cooperate to elevate the arms and the central hub above a planar surface engaged by the surface-engaging rollers. Each arm carries a chair foot receptacle adapted to receive and support a chair foot, and the chair foot receptacles define a notional chair footprint circumscribing the chair foot receptacles. The surface-engaging rollers have centers of rotation that are inside the chair footprint, and the chair foot receptacles are positioned inferiorly of the centers of rotation of the surface-engaging rollers.

A combination may comprise a chair caddie as described above, and a chair having four chair legs, with each chair leg having a respective chair foot and the chair defining a notional chair footprint circumscribing the chair feet. The chair feet are received in the chair foot receptacles to create a cantilever arrangement in which the chair feet are supported below the centers of rotation of the surface-engaging rollers whereby the chair feet are elevated above the surface by less than half of a height of the surface-engaging rollers.

BRIEF DESCRIPTION OF THE DRAWINGS

These and other features will become more apparent from the following description in which reference is made to the appended drawings wherein.

DETAILED DESCRIPTION OF THE INVENTION

Figure 1A:
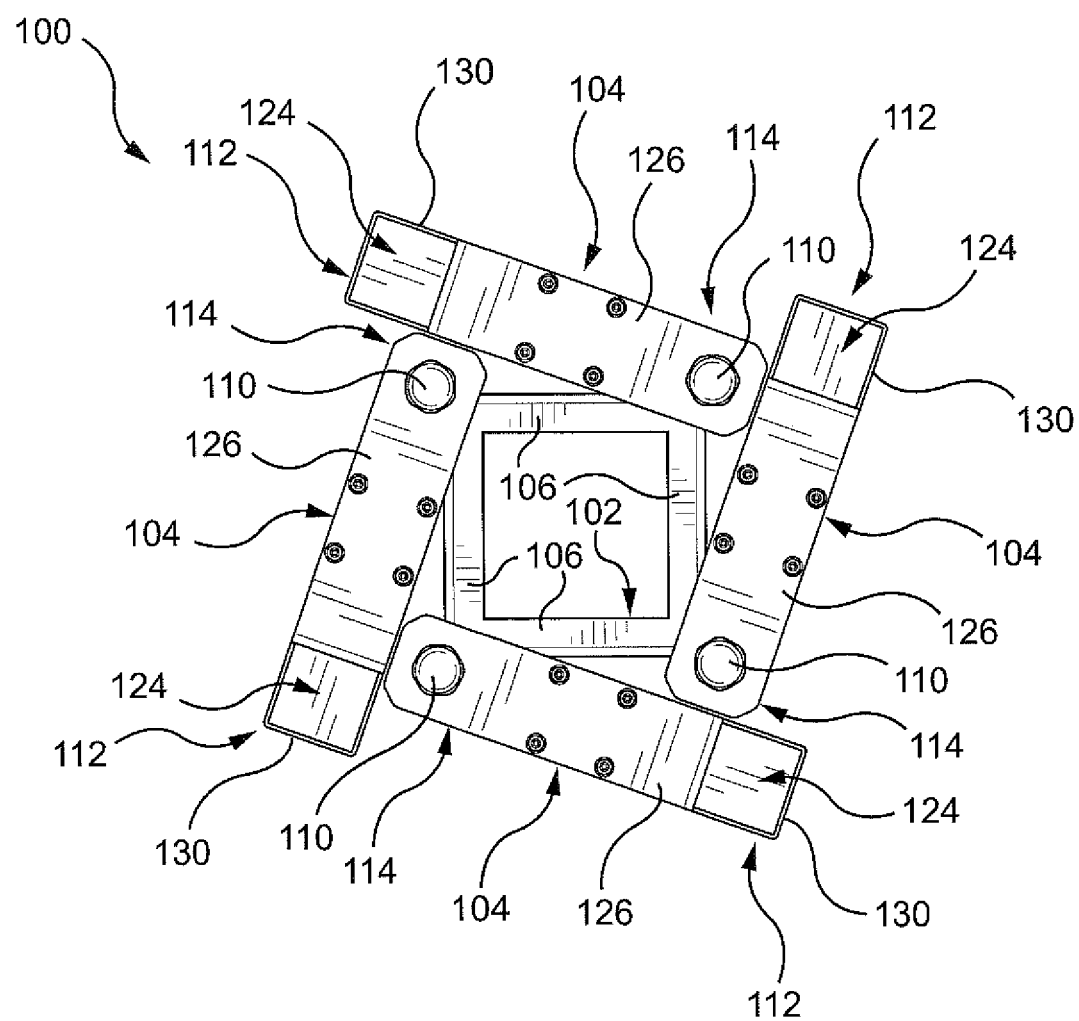
FIG. 1A shows a top plan view of a first exemplary chair caddie according to an aspect of the present disclosure in a fully retracted configuration.
Figure 1B:
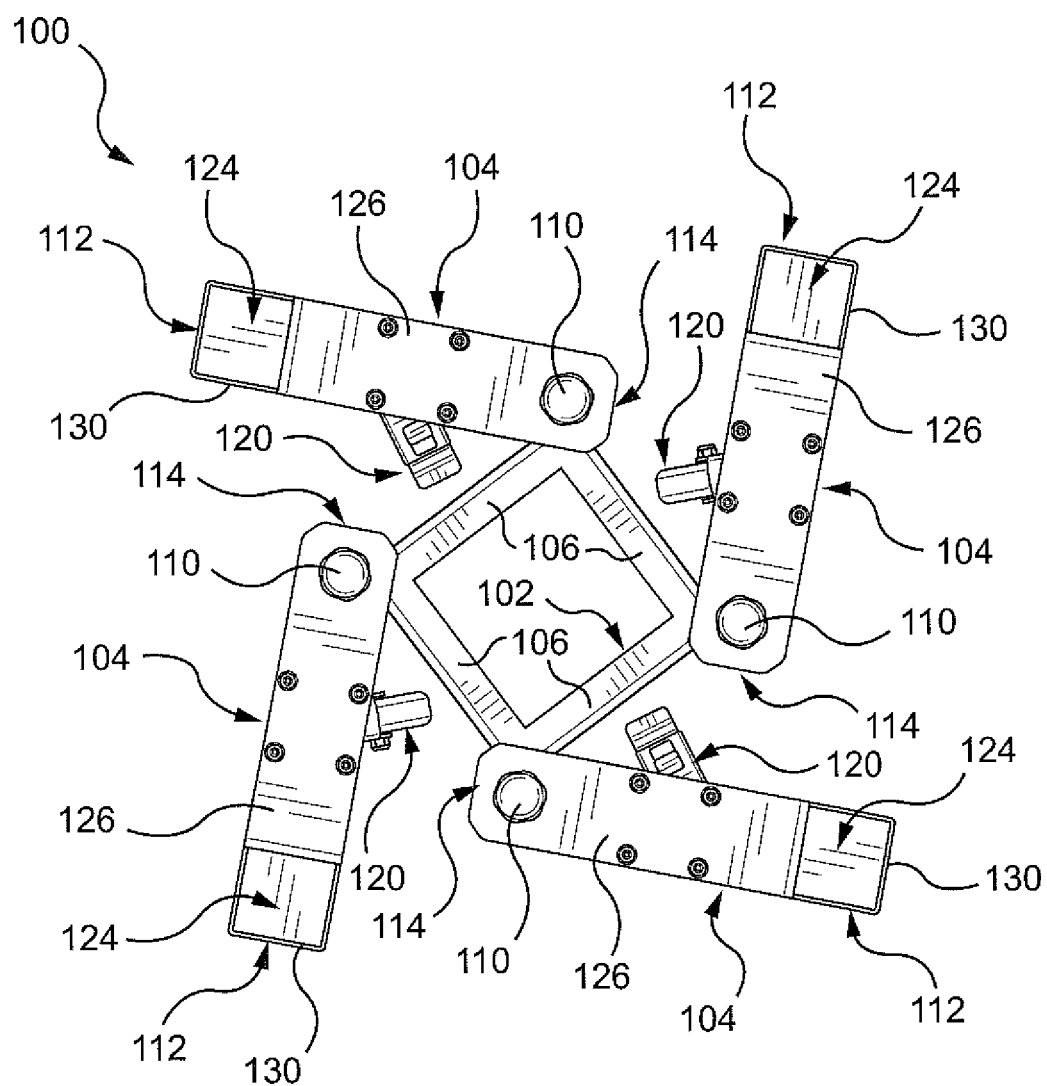
FIG. 1B shows a top plan view of the chair caddie of FIG. 1A in a first partially extended configuration.
Figure 1C:
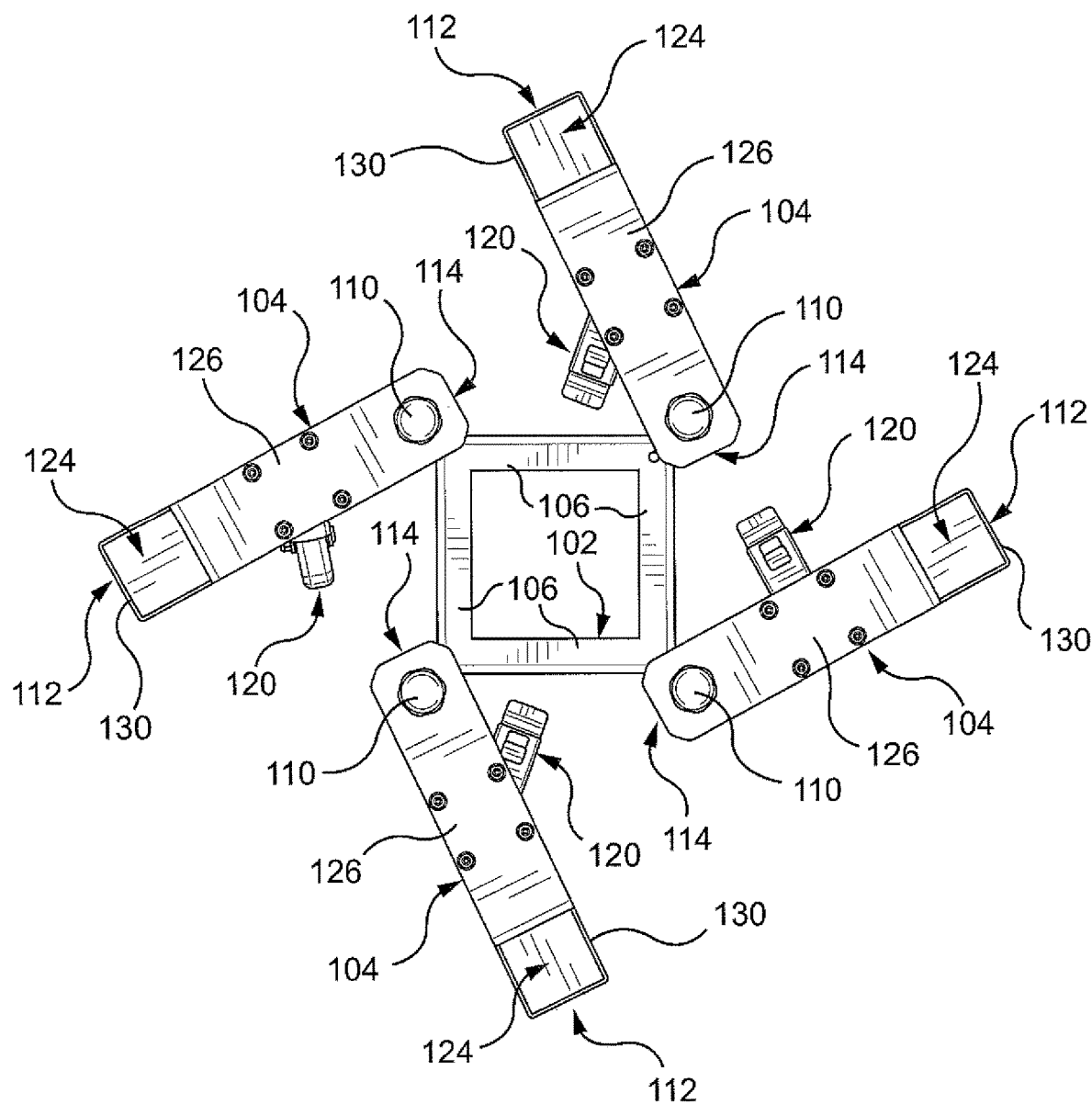
FIG. 1C shows a top plan view of the chair caddie of FIG. 1A in a second partially extended configuration.
Figure 1D:
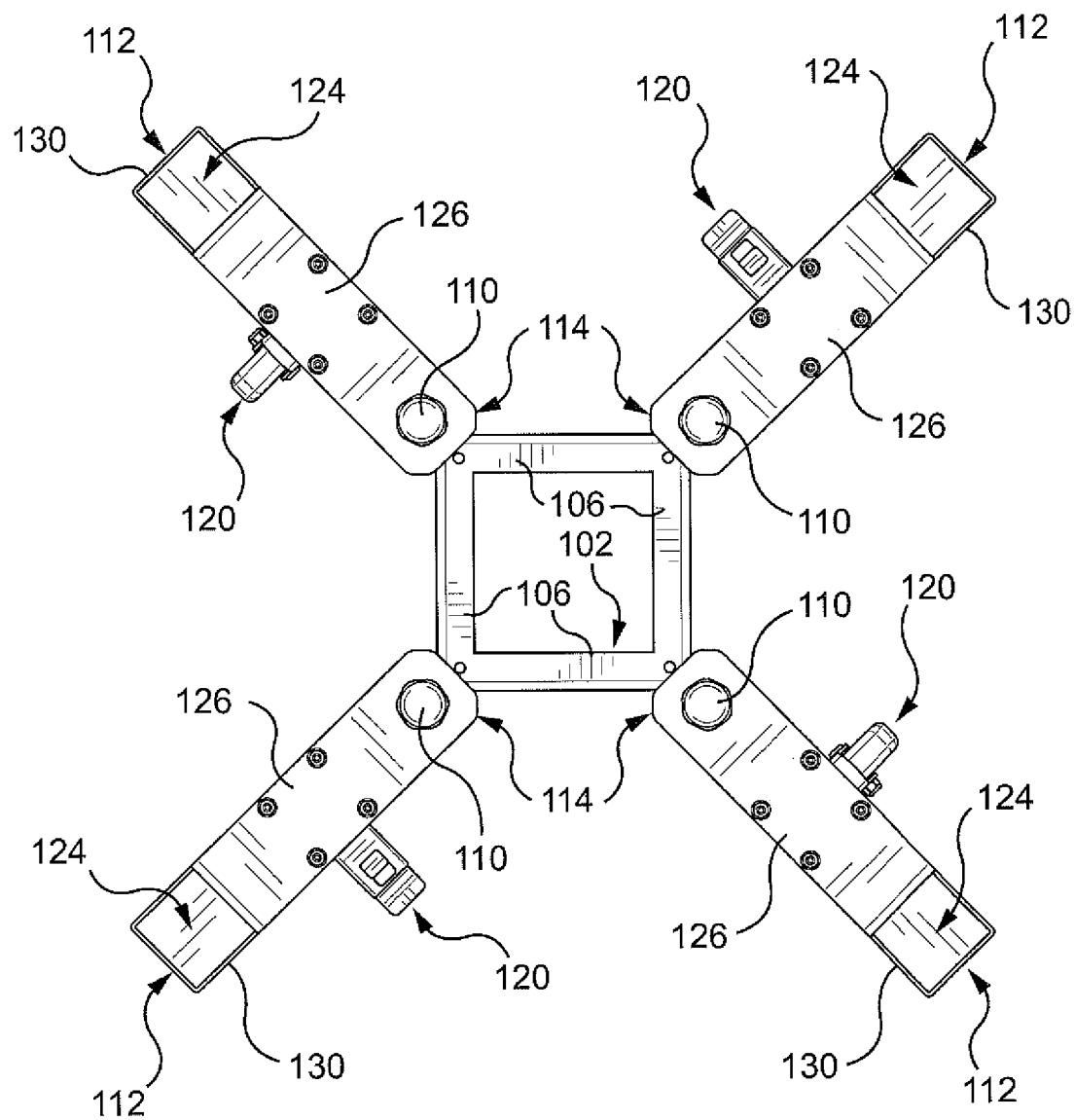
FIG. 1D shows a top plan view of the chair caddie of FIG. 1A in a fully extended configuration.
Figure 2A:
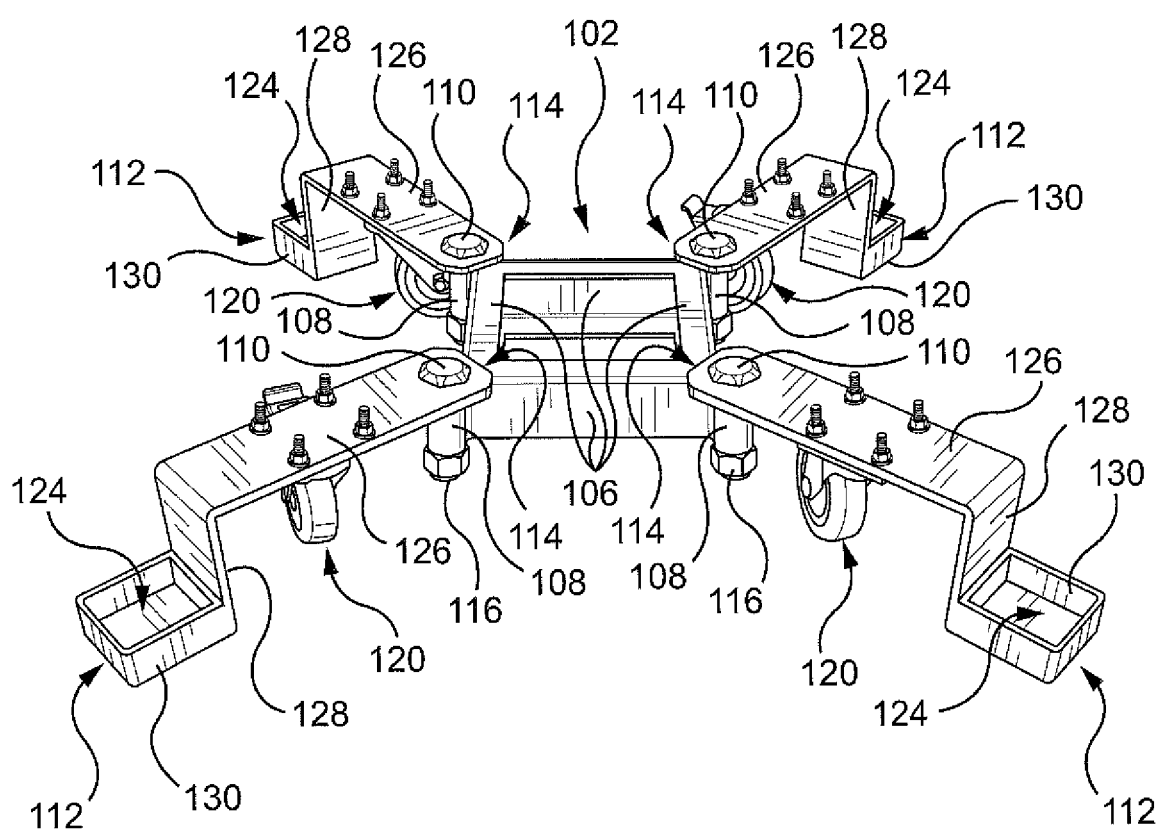
FIG. 2A shows a top perspective view of the chair caddie of FIG. 1A in the fully extended configuration.
Figure 2B:
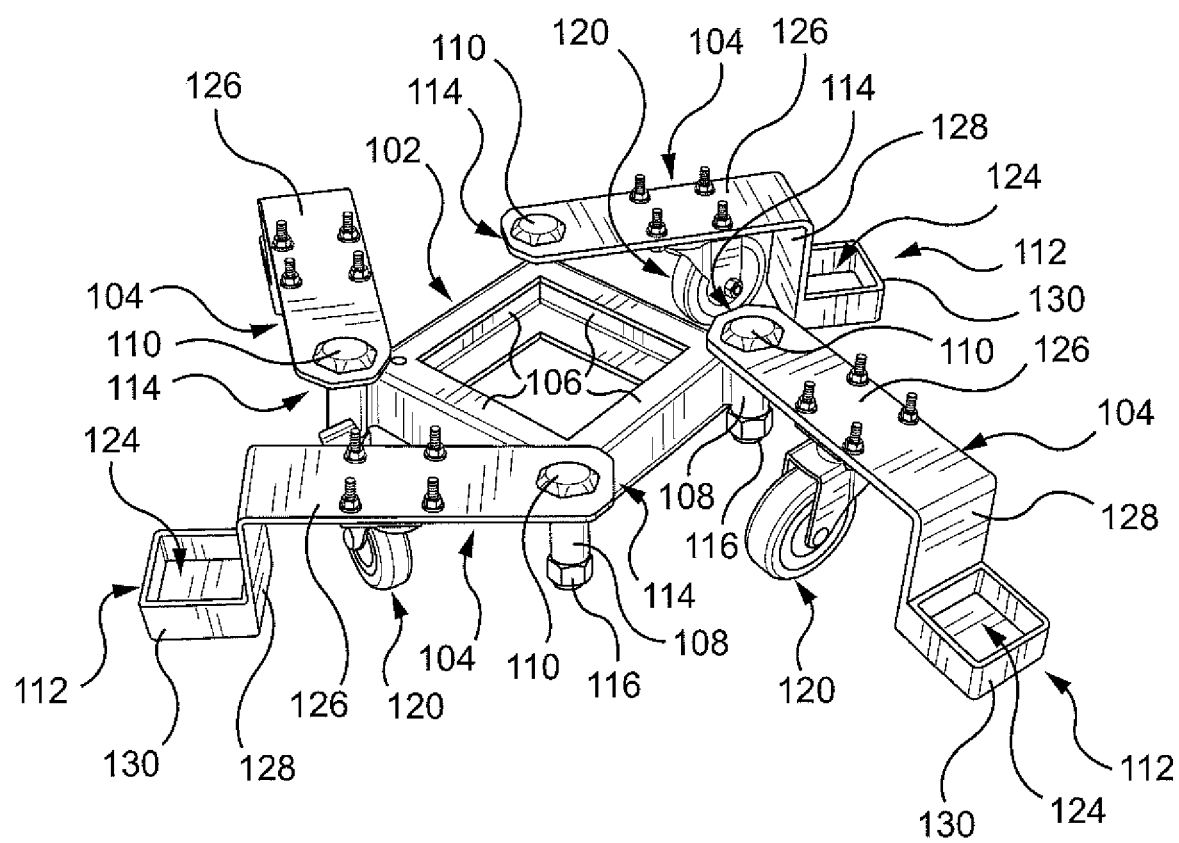
FIG. 2B shows a top perspective view of the chair caddie of FIG. 1A in a third partially extended configuration.
Figure 3:
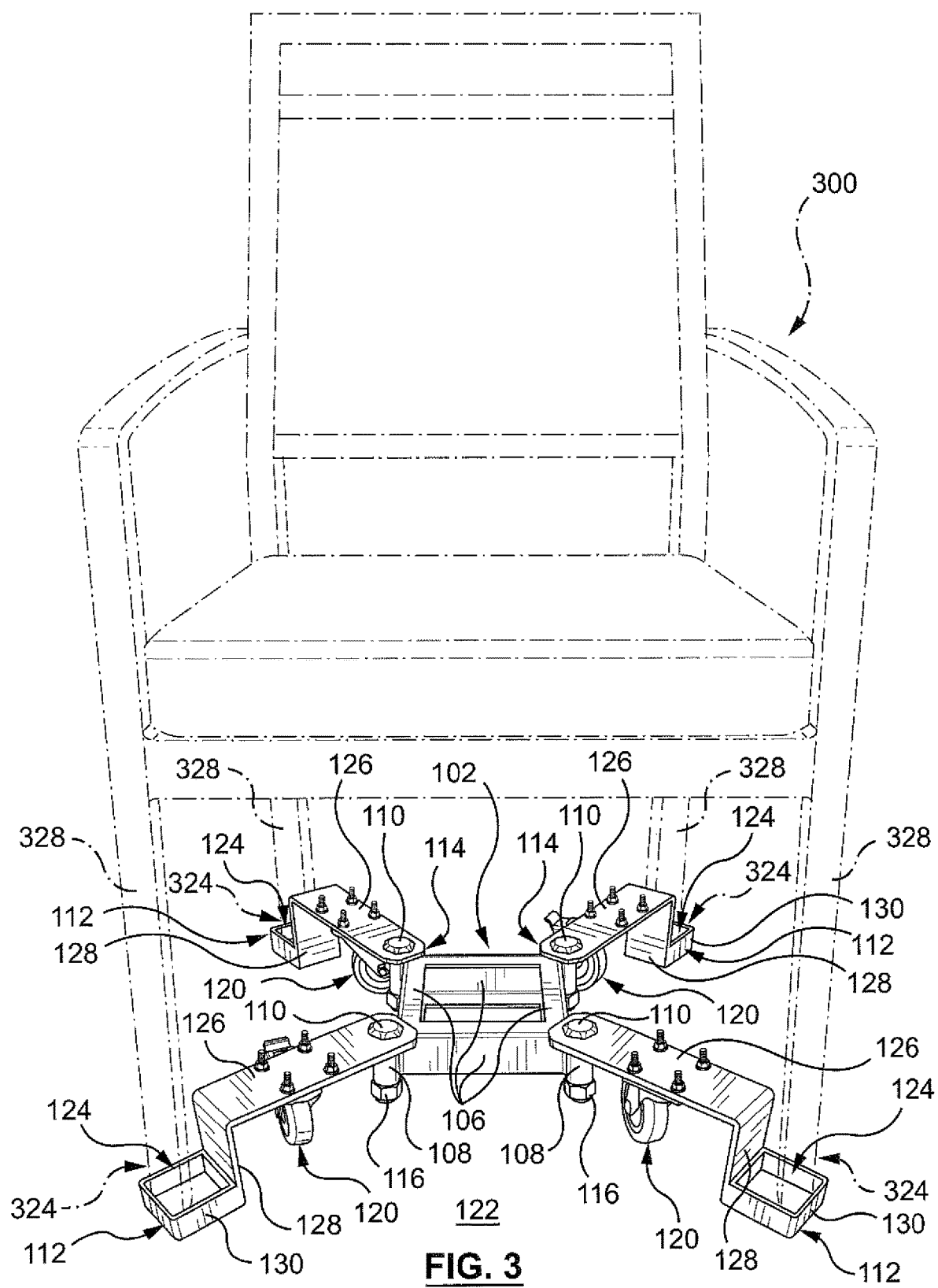
FIG. 3 shows a top perspective view of the chair caddie of FIG. 1A in a fully extended configuration with an exemplary chair received thereon.
Figure 4A:
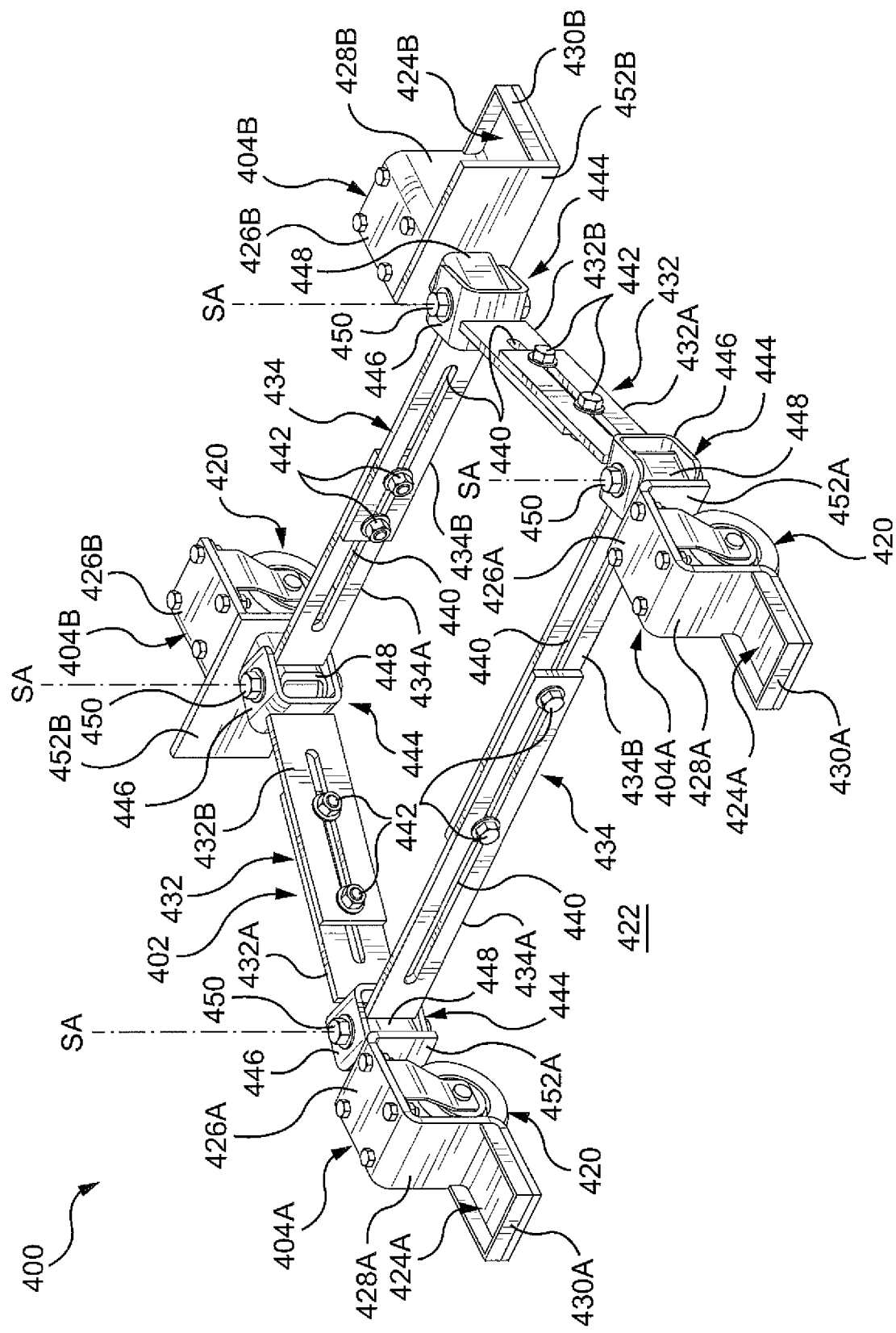
FIG. 4A shows a first top perspective view of a second exemplary chair caddie according to an aspect of the present disclosure.
Figure 4B:
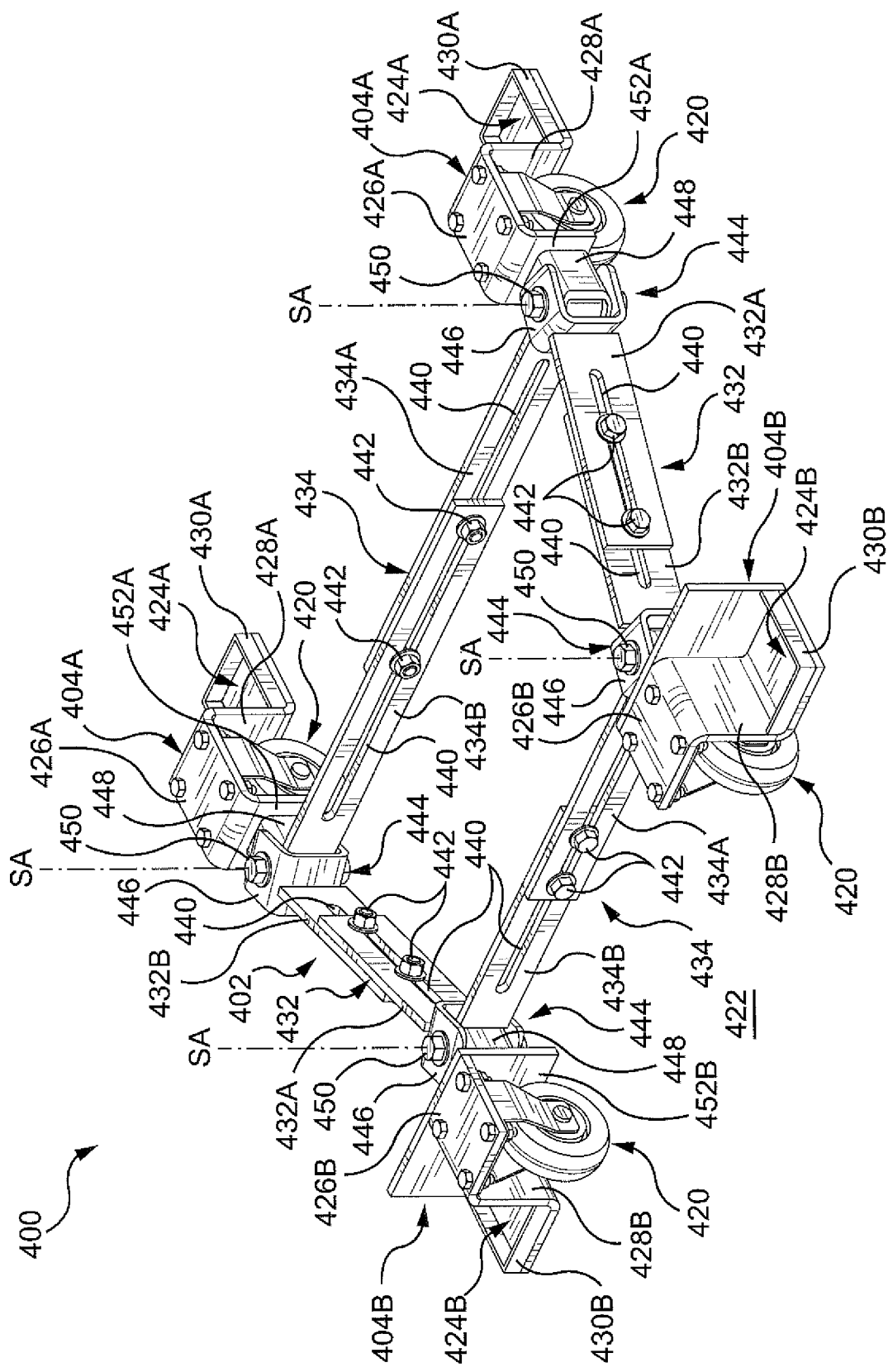
FIG. 4B shows a second top perspective view of the chair caddie of FIG. 4A.
Figure 5:
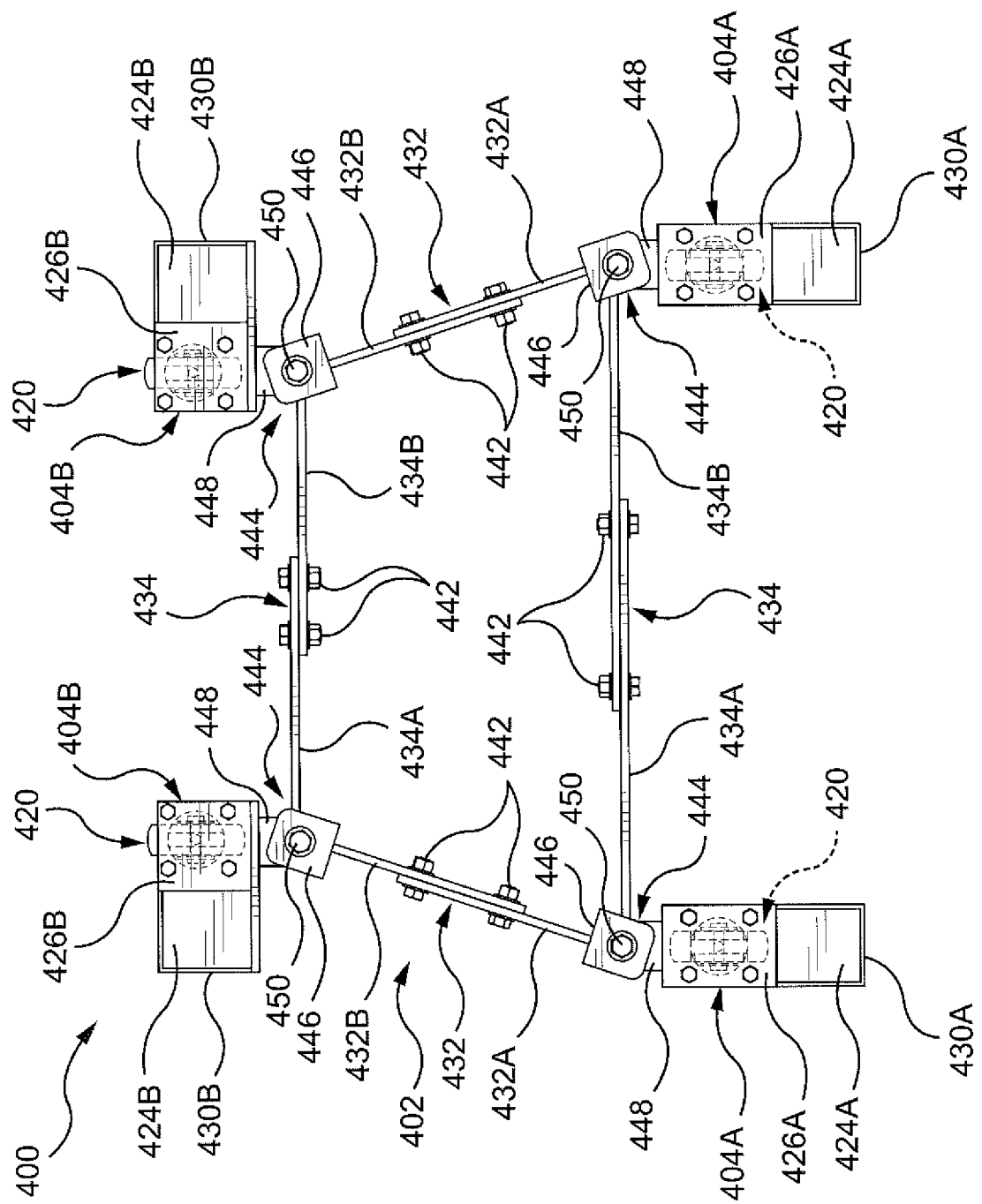
FIG. 5 shows a top plan view of the chair caddie of FIG. 4A.

Reference is first made to FIGS. 1 to 3, which show a first exemplary chair caddie, indicated generally by reference 100, according to an aspect of the present disclosure. The chair caddie 100 shown in FIGS. 1 to 4 comprises a rigid central hub 102 and four rigid arms 104. Each of the four arms 104 is pivotally coupled to and extends outwardly from the central hub 102. In the first exemplary chair caddie 100, the central hub 102 is of fixed dimension so that the arms 104 are pivotally coupled to the central hub 102 at fixed pivot positions relative to one another. In the illustrated embodiment, the central hub 102 is a hollow square formed by four rigid struts 106 of fixed length that are fixed to one another at right angles. A pivot mount in the form of a bushing (hollow cylindrical sleeve) 108 (see FIGS. 2A to 3) extends outwardly from each corner of the central hub 102, with the longitudinal axes of the bushings 108 being substantially parallel to one another and substantially perpendicular to a notional plane of the square formed by the central hub 102. Thus, the bushings 108 define the fixed pivot positions. The arms 104 are pivotally coupled to the central hub 102 by way of heavy bolts 110 welded to the arms 104 at pivot ends 114 thereof and which pass through the bushings 108 and are secured by nuts 116 (see FIGS. 2A to 3). It will be appreciated that bearings may be used instead of bushings.

Each of the four arms 104 is adapted to support a chair leg, that is, each arm is strong enough, in conjunction with the bolts 110, nuts 116 and hub 102, to support the portion of the weight of an occupied chair that the arm 104 will bear when in use. In one exemplary embodiment, the bushings may be 2.5 inches in length to provide structural rigidity. Each of the four arms 104 is, in turn, supported by a surface-engaging roller 120. The surface engaging rollers 120 are shown in the Figures as comprising individual caster-type wheels, but may also comprise, for example, a plurality of wheels arranged co-axially, or axially elongated wheels, or ball/spherical rollers. Thus, the surface-engaging rollers may have different sizes and profiles. The four surface-engaging rollers 120 cooperate to elevate the arms 104 and the central hub 102, bolts 110 and nuts 116 above a planar surface 122 (see FIG. 3) engaged by the surface-engaging rollers 120. It is to be understood that the term "roller", as used herein, includes not only the element which itself rolls (e.g. wheel or ball) but also the related support and mounting hardware (e.g. in the case of a caster-type roller, the term "roller" would include the wheel, axle, yoke, bearings, top plate, etc.).

Each of the arms 104 carries at its distal end 112 a chair foot receptacle 124 adapted to receive and support a chair foot. In the illustrated embodiment, each of the arms 104 comprises a spacer portion 126 extending outwardly from the central hub 102 and a step-down portion 128 (see FIGS. 2A to 3) depending from the spacer portion 126, with the chair foot receptacle 124 extending outwardly from the step-down portion 128. The surface-engaging rollers 120 are mounted on the underside of the spacer portions 126, for example by nut-and-bolt assemblies, between the chair foot receptacle 124 and the pivot positions defined by the bushings 108 on the central hub 102. Thus, each of the surface-engaging rollers 120 is positioned longitudinally inboard of the chair foot receptacle 124 on its respective arm 104. As used in respect of the surface-engaging rollers 120, the term "longitudinally inboard" means positioned between the chair foot receptacle 124 on its respective arm 104 and the pivot position (e.g. defined by bushing 108) of its respective arm 104. In the illustrated embodiment, the surface-engaging rollers 120 are free to pivot relative to their respective arms 104 about a yaw axis that is substantially parallel to the axes of the bushings 108 and substantially perpendicular to a notional plane of the square formed by the central hub 102. Thus, the yaw axis will also be substantially perpendicular to a planar surface engaged by the surface-engaging rollers 120. For greater certainty, as used herein the term "yaw" refers to pivotal movement that changes the rolling direction of the surface-engaging rollers, to the left or right of its current rolling direction.

In the illustrated embodiment, each chair foot receptacle 124 includes a chair foot confinement to inhibit a chair foot from sliding off the chair foot receptacle 124. In the exemplary embodiment, the chair foot confinement takes the form of an upstanding surrounding rail 130, but may have other forms, such as the wall of a cup-shaped chair foot receptacle, or a hole to receive a bolt for securing a chair foot, or a clamp, strap, band or the like. These are merely examples of chair foot confinements and are not intended to be limiting. Where the chair foot confinement is an upstanding rail, it should be positioned at least on the outer edge of the respective chair foot receptacle (e.g. the two adjacent outer edges in the case of a rectangular chair foot receptacle). The chair foot confinements may assist in providing lateral stability to a mounted chair, which may obviate the risk associated with splaying of a wooden chair.

By adjusting the pivot positions of the arms 104 relative to the central hub 102, the relative positions of the chair foot receptacle 124 can be made to accommodate a wide variety of different chair foot configurations and thereby accommodate a wide range of chairs to enable them to roll. FIG. 3 shows a chair 300 with the feet 324 at the end of the legs 328 of the chair received in the chair foot receptacles 124.

Reference is now made to FIGS. 4A to 6, in which a second exemplary chair caddie is indicated generally by reference 400. The second exemplary chair caddie 400 comprises a central hub 402 and four arms 404A, 404B coupled to and extending outwardly from the central hub 402. Whereas in the first exemplary chair caddie 100 the central hub 102 was of fixed dimension, in the second exemplary chair caddie 400 the central hub 402 is of adjustable dimension so that the arms 404A, 404B are coupled to the central hub at pivot positions that can be adjusted relative to one another, as will be described further below.

In the illustrated embodiment, the central hub 402 comprises four struts arranged as a first pair of opposed struts 432 and a second pair of opposed struts 434. Each of the struts 432, 434 is of adjustable length and is lockable at a selected length. More particularly, in the illustrated embodiment each strut 432, 434 comprises two telescopically engaged strut members 432A, 432B and 434A, 434B, respectively. Each of the strut members 432A, 432B, 434A, 434B has an elongate slot 440 and the strut members 432A, 432B, 434A, 434B are arranged so that the elongate slots 440 are in registration with one another. The respective strut members 432A, 432B, 434A, 434B are coupled to one another by a pair of nut-and-bolt assemblies 442 passing through the elongate slots 440. By loosening the nut-and-bolt assemblies 442, the strut members 432A, 432B, 434A, 434B can slide relative to one another to adjust the length of the struts 432, 434, and the nut-and-bolt assemblies 442 can then be tightened to lock the strut members 432A, 432B, 434A, 434B together and thereby lock the struts 432, 434 at a selected length. In the illustrated embodiment, the elongate slots 440 make each strut 432, 434 infinitely adjustable between a maximum length and a minimum length. In other embodiments, other locking structures, such as for example a ratchet-and-pawl arrangement, may be used. With a ratchet-and-pawl arrangement, each strut is incrementally adjustable between a maximum length and a minimum length.

Each strut 432, 434 is pivotally coupled to each adjacent strut 432, 434 at respective strut joints 444 so that each strut 432, 434 can pivot relative to each adjacent strut 432, 434 about a respective strut pivot axis SA. As can be seen in the Figures, the strut pivot axes SA are parallel to one another, and perpendicular to a generally planar surface 422 on which the caddie 400 rests. In the illustrated embodiment, the strut joints 444 are knuckle joints. Each strut 432 in the first pair of struts 432 has two fork ends 446 and each strut 434 in the second pair of struts 434 has two eye ends 448; the eye ends 448 are received within the fork ends 446 and secured therein by nut-and-bolt assemblies 450 to form the strut joints 444. Loosening the nut-and-bolt assemblies 450 allows adjustment of the relative pivotal positions of adjacent struts 432, 434, and then the nut-and-bolt assemblies 450 can be tightened to secure the struts 432, 434 in the desired pivotal position. Thus, each strut joint 444 is lockable so as to secure the respective struts 432, 434 in fixed pivotal positions relative to one another. The illustrated knuckle joint is a type of pin/bushing connection, and is merely one exemplary embodiment of a strut joint, and other types of strut joints may also be used.

The arms 404A, 404B are coupled to the central hub 402 at the strut joints 444. Because the struts 432, 434 are of adjustable length, the relative positions of the strut joints 444 can be adjusted by adjusting the lengths of the struts 432, 434. Since the arms 404A, 404B are coupled to the central hub 402 at the strut joints 444, the arms 404A, 404B are coupled to the central hub 402 at positions that can be adjusted relative to one another. The illustrated embodiment is merely one exemplary implementation of an arrangement in which the arms are coupled to the central hub 402 at positions that can be adjusted relative to one another; other such arrangements are also contemplated.

As with the first exemplary embodiment 100, in the second exemplary embodiment 400 each of the four arms 404A, 404B is adapted to support a chair leg. Thus, each arm 404A, 404B is strong enough, in conjunction with the strut joints 444 and the central hub 402, to support the portion of the weight of an occupied chair that the arm 404A, 404B will bear when in use. Also, similarly to the first exemplary embodiment 100, in the second exemplary embodiment 400, each of the four arms 404A, 404B is supported by a respective surface-engaging roller 420; the surface-engaging rollers 420 cooperate to elevate the arms 404A, 404B, strut joints 444 and hub 402 above a planar surface 422 engaged by the surface-engaging rollers 420. Although shown as comprising individual conventional wheels, the surface-engaging rollers 420 may also take other forms, similarly to the first exemplary embodiment described above.

Each of the arms 404A, 404B is fixed to and extends from the eye end 448 of one of the struts 434 in the second pair of struts 434 at a substantially right angle to the respective strut 434. Thus, a first one of the struts 434 in the second pair of struts 434 carries a first pair of adjacent arms 404A, and a second one of the struts 434 in the second pair of struts 434 carries a second pair of adjacent arms 404B. Both types of arms 404A, 404B carry a respective chair foot receptacle 424A, 424B adapted to receive and support a chair foot and having a respective chair foot confinement in the form of an upstanding surrounding rail 430A, 430B (although, analogously to the first exemplary embodiment, other types of confinement may also be used).

In the illustrated embodiment, the arms 404A in the first pair of adjacent arms 404A have a different structure than the arms 404B in the second pair of adjacent arms 404B, and the first pair of arms 404 define a notional front of the second exemplary chair caddie 400. The term "front", as used in this context, refers to the chair leg receptacles 424A intended to receive the front legs of a chair, in the sense of the direction a person seated normally in such a chair would be facing.

For the first pair of adjacent arms 404A, each surface-engaging roller 420 is positioned longitudinally inboard of the chair foot receptacle 424A on its respective arm 404A. As noted above, the term "longitudinally inboard" means positioned between the chair foot receptacle 424A on its respective arm 404A and the pivot position (e.g. defined by strut joint 444) of its respective arm 404A. However, for the second pair of adjacent arms 404B, each surface-engaging roller 420 is positioned laterally inboard of the chair foot receptacle 424B on its respective arm 404B. The term "laterally inboard" means that, for the second pair of arms 404B, the surface-engaging rollers 420 are positioned between the chair foot receptacles 424B of the second pair of arms 404B, i.e. for each of the surface-engaging rollers 420 on the second pair of arms 404B, a notional straight line can be drawn through the chair foot receptacles 424B on the second pair of arms 404B that also passes through that surface-engaging roller 420.

In the second exemplary embodiment 400, the arms 404A in the first pair of adjacent arms 404A have a structure similar to that of the arms 104 in the first illustrated embodiment. Each of the arms 404A comprises a knuckle support plate 452A from which the eye end 448 extends inwardly toward the central hub 402. A spacer portion 426A extends from the upper edge of the knuckle support plate 452A, on the side thereof opposite the side from which the eye end 448 extends, i.e. outwardly from the central hub 402. A step-down portion 428A depends from the spacer portion 426A, substantially parallel to the knuckle support plate 452A, and the chair foot receptacle 424A extends outwardly from an outer face of the step-down portion 428A, away from the central hub 402. The surface-engaging rollers 420 are mounted the underside of the spacer portions 426A, e.g. by nut-and-bolt assemblies, between the knuckle support plate 452A and the step-down portion 428A. Thus, the surface-engaging rollers 420 on the first pair of adjacent arms 404A are positioned between the chair foot receptacle 424A and the strut joints 444. In the illustrated embodiment, the surface-engaging rollers 420 on the first pair of adjacent arms 404A have a fixed yaw relative to their respective arms 404A, and have parallel rolling directions.

The arms 404B in the second pair of adjacent arms 404B each comprise a knuckle support plate 452B. The fork end 446 extends inwardly from one side of the knuckle support plate 452B toward the central hub 402 and a spacer portion 426B extends from the other side of the knuckle support plate 452B at the upper edge thereof, outwardly from the central hub 402. A step-down portion 428B depends from the spacer portion 426B, substantially perpendicular to the knuckle support plate 452B. The inner vertical edge of the step-down portion 428B is joined to the knuckle support plate 452B, and the chair foot receptacle 424B extends from the outer face of the step-down portion 428B. The surface-engaging rollers 420 are mounted on the undersides of the spacer portions 426B, for example by nut-and-bolt assemblies, between the opposed step-down portions 428B on the second pair of adjacent arms 404B. Thus, the surface-engaging rollers 420 on the second pair of adjacent arms 404B are positioned between the chair foot receptacles 424B. The surface-engaging rollers 420 on the second pair of adjacent arms 404B may have a fixed yaw relative to their respective arms 404B, with parallel rolling directions, or may be free to pivot about a yaw axis relative to their respective arms 404B.

By adjusting the lengths of the struts 432, 434, the relative positions of the strut joints 444, and therefore the relative positions of the arms 404A, 404B coupled to the central hub 402 at the strut joints 444, can be adjusted. Since the arms 404A, 404B carry the chair foot receptacles 424A, 424B, the adjustability of the arms 404A, 404B allows the relative positions of the chair foot receptacles 424A, 424B to be adjusted to accommodate a wide variety of different chair foot configurations and thereby accommodate a wide range of chairs to enable them to roll. Alternatively, the chair foot receptacles may have fixed positions relative to one another (e.g. a rigid hub). This approach might be used where a chair caddie is intended for use with a particular model of chair, the chair foot receptacles may have fixed positions in registration with positions of the chair feet of the chair with which the chair caddie is to be used. For example, and without limitation, the nut-and-bolt assemblies 442 that lock the strut members 432A, 432B, 434A, 434B together could be replaced with welds or rivets to create a rigid central hub 402. Other approaches to constructing a rigid hub may also be used. In some embodiments, for example where a chair caddie is intended for use with a particular model of chair, the chair foot receptacles may be provided with bolts, clamps or other apparatus for fixing the chair feet to the respective chair foot receptacles to form an integrated unit comprising a chair and chair caddie.

Figure 6:
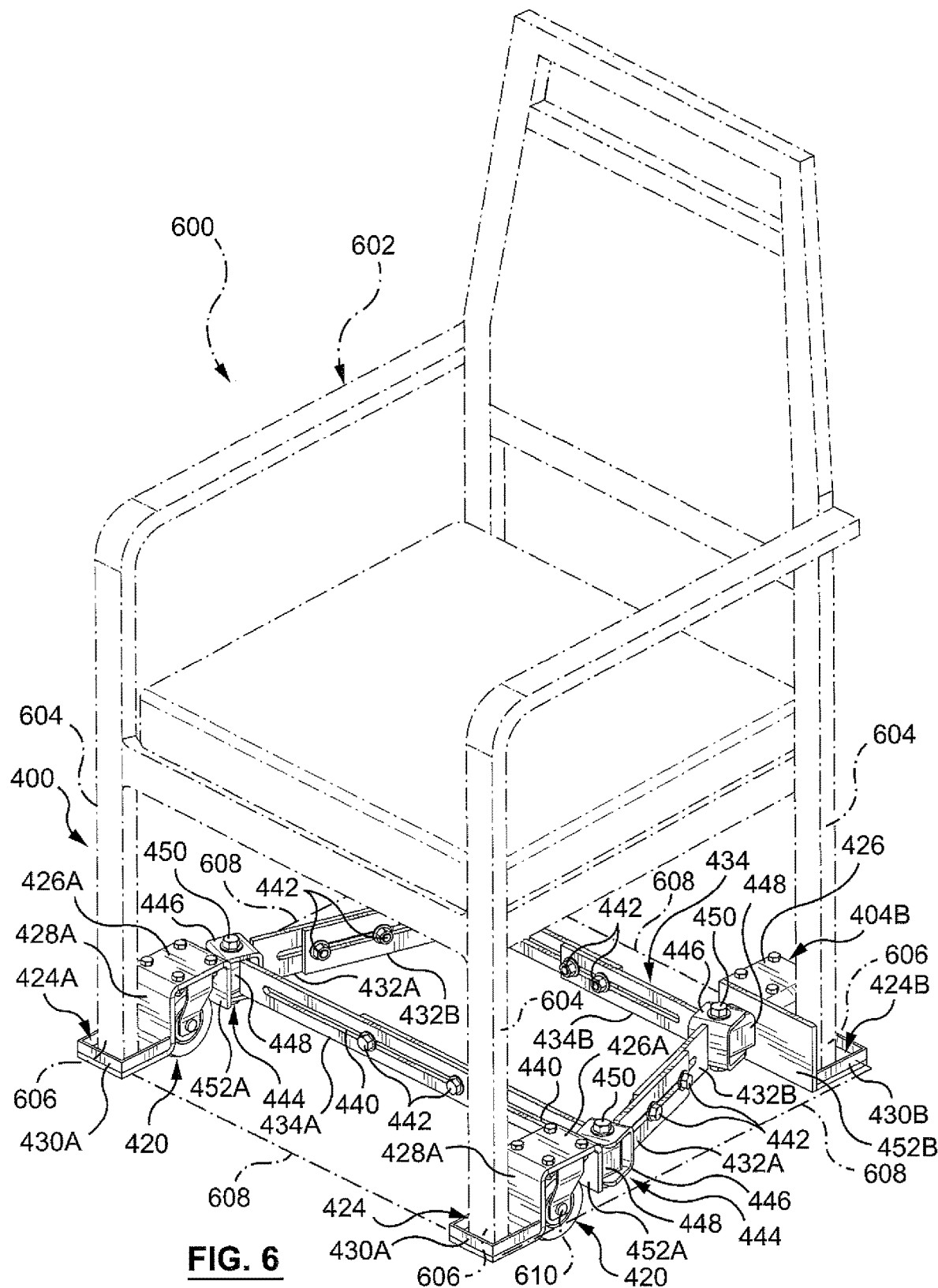
FIG. 6 shows a top perspective view of the chair caddie of FIG. 4A with an exemplary chair received thereon.

Reference is now made to FIG. 6, which shows a combination, indicated generally by reference 600, comprising the chair caddie 400 together with an exemplary chair 602. The chair 602 has four chair legs 604, with each chair leg having a respective chair foot 606. The chair foot receptacles 424A, 424B defining a notional chair footprint, shown by dashed line 608, circumscribing the chair foot receptacles 424A, 424B; since the chair feet 606 are received in the chair foot receptacles 424A, 424B the chair footprint also circumscribes the chair feet 606. As can be seen, the surface-engaging rollers 420 have centers of rotation 610 that are inside the chair footprint 608. The surface-engaging rollers 420 are inboard of the chair foot receptacles 424A, 424B that support the chair feet 606 and the chair foot receptacles 424A, 424B are positioned inferiorly of (i.e. below, in an upright configuration) the centers of rotation of the surface-engaging rollers 420. This creates a cantilever arrangement in which the chair feet 606 are supported below the centers of rotation of the surface-engaging rollers 420, allowing the chair feet 606 to be elevated above the surface 422 by an amount much less than the height of the wheels. Thus, the chair caddie 400 can have large, relatively stable surface-engaging rollers 420 while elevating the chair 602 by less than half of the height of the surface-engaging rollers 420, preferably substantially less than half of the height of the surface-engaging rollers 420. This provides for low profile mounting of the chair 602 on the chair caddie 400, which makes it easier for the arms to fit underneath the apron of a table. (By reference to FIG. 3, it can be seen that the first exemplary chair caddie 100 has a similar construction. In particular, the surface-engaging rollers 120 have centers of rotation located inside a notional chair footprint circumscribing the chair foot receptacles 124, with the chair foot receptacles 124 positioned inferiorly of the centers of rotation of the surface-engaging rollers 120.)

As noted above, in the exemplary chair caddie 400, the surface-engaging rollers 420 on the first pair of adjacent arms 404A have a fixed yaw relative to their respective arms 404A. These are the "front" surface-engaging rollers 420; the term "front", as used in this context, refers to the surface-engaging rollers 420 associated with the chair leg receptacles 424A intended to receive the front legs of a chair, in the sense of the direction a person seated normally in such a chair would be facing. Thus, the surface-engaging rollers 420 on the second pair of adjacent arms 404B may be considered the "rear" surface-engaging rollers 420 in terms of intended chair direction. If the surface-engaging rollers 420 on the second pair of adjacent arms 404B also have a fixed yaw relative to their respective arms 404B, then all of the surface-engaging rollers 420 will have a fixed yaw with parallel rolling directions. In such embodiments, at least two adjacent arms 404A, 404B may carry a braking mechanism. For example, only the first pair of adjacent arms 404A may carry a braking mechanism, or only the second pair of adjacent arms 404B may carry a braking mechanism, or all four of the arms 404A, 404B may carry a braking mechanism. In some preferred embodiments, the surface-engaging rollers 420 on the first pair of adjacent arms 404A (the "front" surface-engaging rollers 420) have a fixed yaw relative to their respective arms 404A and the surface-engaging rollers 420 on the second pair of adjacent arms 404B (i.e. the "rear" surface-engaging rollers 420) have a movable yaw relative to their respective arms 404B. In such embodiments, it is preferred (although not essential) that only the first pair of adjacent arms 404A (i.e. having the "front" surface-engaging rollers 420) carry a braking mechanism. In such embodiments, the braking mechanism may be controlled by an elevated brake actuator positioned near an arm of the chair, as described further below. Alternatively, if the first pair of adjacent arms 404A (i.e. having the "front" surface-engaging rollers 420) do not carry a braking mechanism, a foot-activated braking mechanism can be provided on the second pair of adjacent arms 404B (i.e. for braking the "rear" surface-engaging rollers 420). For example, the "rear" surface-engaging rollers may be foot-activated locking swivel casters.

Figure 7:
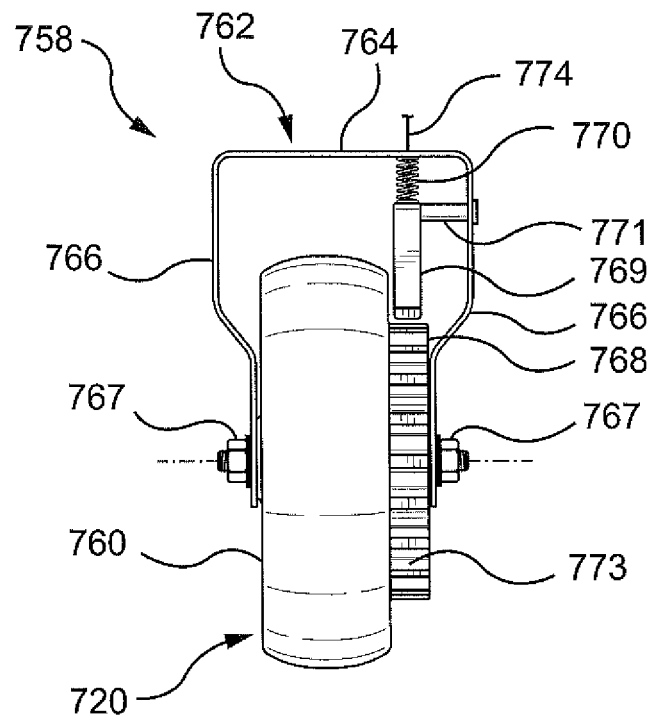
FIG. 7 is an end elevation view of an exemplary braking mechanism according to an aspect of the present disclosure.
Figure 8:
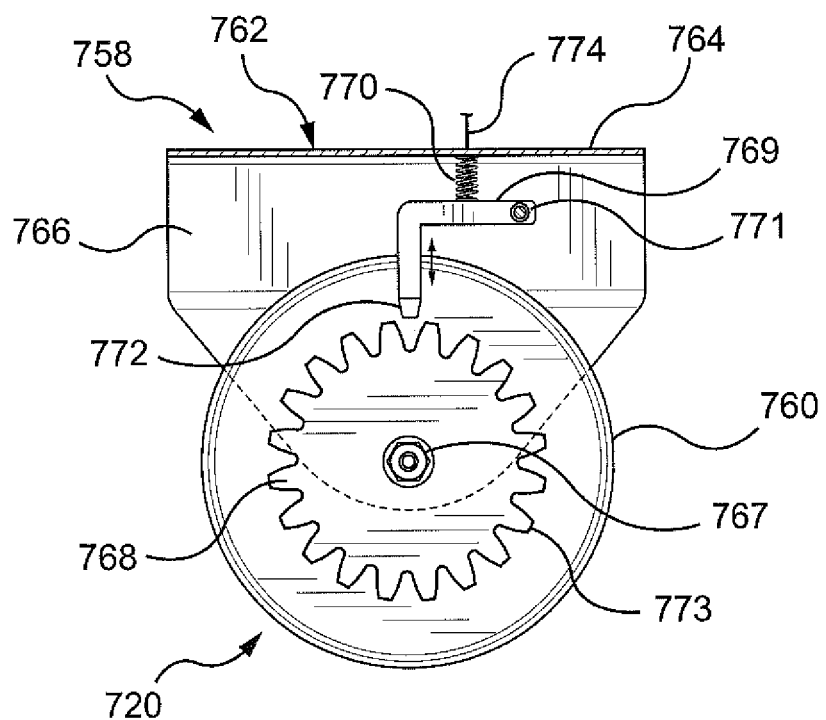
FIG. 8 is a side cross-sectional view of the braking mechanism of FIG. 7.

Reference is now made to FIGS. 7 and 8, which show one exemplary braking mechanism 758. In FIGS. 7 and 8, an exemplary surface-engaging roller is indicated generally by reference 720. The exemplary surface-engaging roller 720 is a fixed caster assembly, and comprises a wheel 760 and a yoke 762 comprising a yoke base 764 and two spaced-apart yoke arms 766 depending from the yoke base 764. The wheel 760 is disposed between the yoke arms 766 and rotates freely about an axle (not shown) extending between the yoke arms 766 and secured by nuts 767. The braking mechanism 758 comprises a toothed cog 768 fixed to one side of the wheel 760, an L-shaped pawl 769 and a biasing member in the form of a coil spring 770. The pawl 769 is pivotally mounted to one of the yoke arms 766, on the same side as the cog 768, by a pivot shaft 771. This enables the pawl 769 to pivot toward and away from the cog 768 so as to move the head 772 of the pawl 769 into and out of meshing engagement with the teeth 773 of the cog 768 (see FIG. 8). The spring 770 is interposed between the yoke base 764 and the pawl 769, and the spring 770 acts between the yoke base 764 and the pawl 769 to urge the pawl 769 toward the cog 768 and hence urge the head 772 of the pawl 769 into and out of meshing engagement with the teeth 773 of the cog 768 to arrest movement of the wheel 760. An actuator cable 774 is fixed to the pawl 769, coaxially with the coil spring 770, and passes through an aperture in the yoke base 764. Tension applied to the actuator cable 774 will pull the pawl 769 away from the cog 778, against the spring 770, and when the tension is released the spring 770 will urge the pawl 769 back into engagement with the cog 768. Thus, when no tension (or tension that is insufficient to overcome the spring 770) is applied to the actuator cable 774, the braking mechanism 758 is in a braking configuration in which the braking mechanism 758 inhibits rotation of the surface-engaging roller 720; the braking mechanism 758 is biased into the braking configuration. By applying sufficient tension to the actuator cable 774, the braking mechanism 758 is movable into a non-braking configuration in which the braking mechanism 758 permits rotation of the surface-engaging roller 720, relative to the braking configuration. The actuator cable 774 may be the inner portion of a conventional coaxial brake cable, which may be coupled to a remote brake actuator. In one preferred embodiment, the actuator is an elevated brake actuator so as to be within easy reach of a caregiver. It is to be noted that the braking mechanism 758 described above is merely exemplary, and a wide range of suitable braking mechanisms may be used. Moreover, while the use of braking mechanisms is preferable in certain embodiments, it is also contemplated that there may be embodiments in which no braking mechanism is used. As will be understood from the above description, the term "braking mechanism", as used herein, encompasses not only conventional friction-based braking mechanisms but also "wheel arrest" systems that rely on positive mechanical interference, i.e. a positive braking mechanism.

Figure 9:
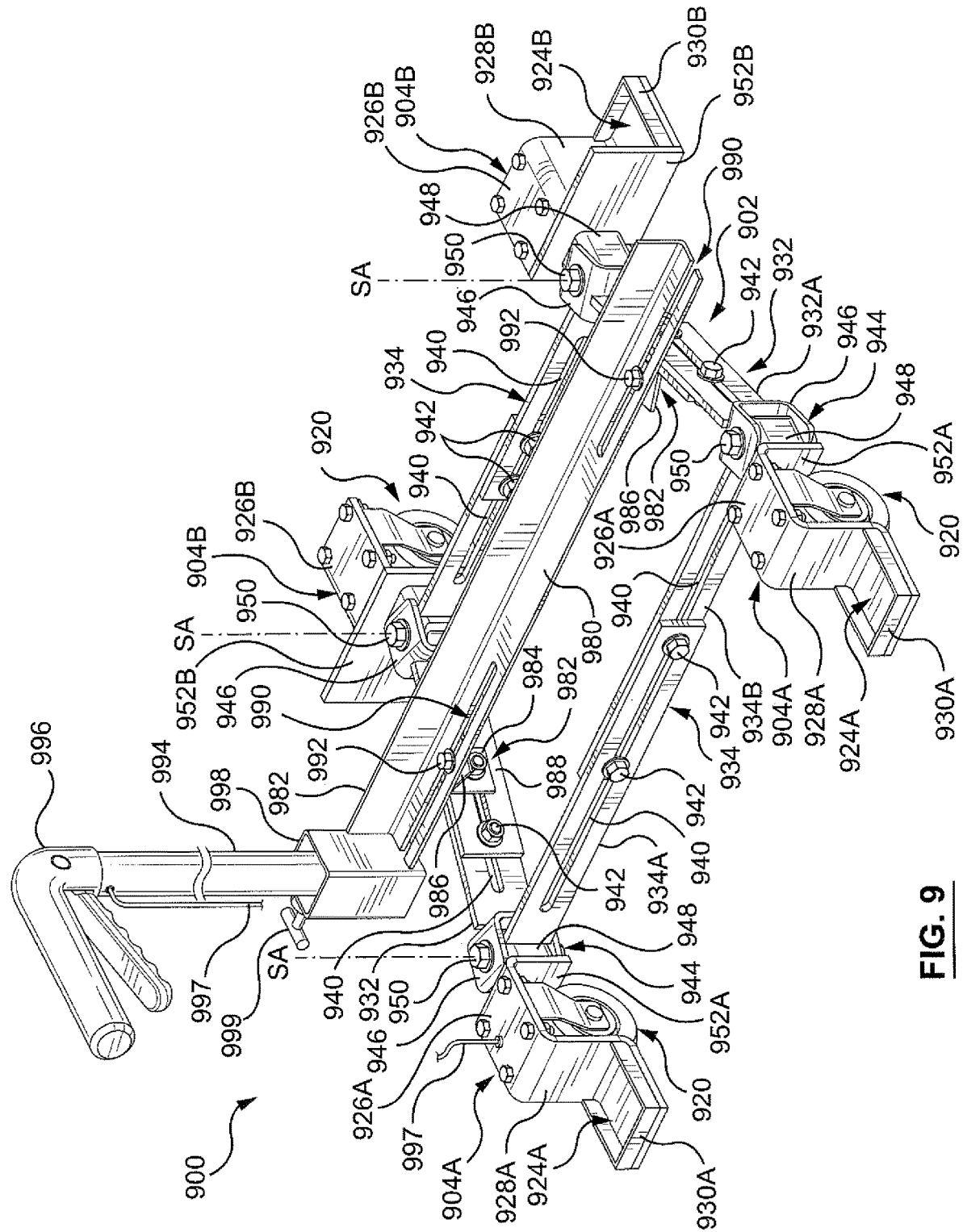
FIG. 9 shows a first top perspective view of a third exemplary chair caddie according to an aspect of the present disclosure.

Reference is now made to FIG. 9, which shows a third exemplary embodiment of a chair caddie, indicated generally at reference 900. Although not specifically shown in FIG. 9, the arms in at least one pair of adjacent arms each carry a braking mechanism such as the braking mechanism 758 shown in FIGS. 7 and 8. Aside from the inclusion of a post-mounted elevated brake actuator, the third exemplary chair caddie 900 is substantially identical to the second exemplary chair caddie 400, and like reference numerals refer to like features except with the prefix "9" instead of "4".

In the third exemplary chair caddie 900, a crossbar 980 extends across the central hub 902. The crossbar 980 is coupled to the central hub 902 in such a way as to permit the configuration of the central hub 902 to be adjusted. In the illustrated embodiment, an angle bracket 982 is adjustably carried by each of the struts 932 in the first pair of struts 932 (i.e. the struts having the fork ends 946). The angle bracket 982 comprises an apertured strut plate 984 and an apertured crossbar mounting plate 986. The strut plate 984 on each angle bracket 982 is secured to one of the struts by a nut-and-bolt assembly 988 that passes through the aperture in the strut plate 984 and also through the elongate slots 940 in the strut 932, between the nut-and-bolt assemblies 942 that secure the strut members 932A, 932B together to form the strut 932 (the nut-and-bolt assembly 988 may provide additional securement, or optionally may replace one of the nut-and-bolt assemblies 942 that secure the strut members 932A, 932B). The crossbar 980 has adjustment slots 990 at either end thereof, through which pass nut-and-bolt assemblies 992 that also pass through the aperture in the crossbar mounting plate 986. When the nut-and-bolt assemblies 988, 992 that couple the angle brackets 982 to the struts 932 and the crossbar 980 are loosened, the angle brackets 982 can slide relative to the struts 932 and the crossbar 980 to permit adjustment of the configuration of the central hub 902. Once the central hub 902 is secured in the desired configuration, the nut-and-bolt assemblies 988, 992 that couple the angle brackets 982 to the struts 932 and to the crossbar 980 can then be tightened to secure the crossbar 980 on the central hub 902.

The crossbar 980 supports a telescopically adjustable post 994 that carries a brake actuator in the form of a handle 996 at its upper end; the handle 996 can be coupled to the braking mechanisms in known manner, for example by conventional coaxial brake cable 997. Thus, in one embodiment the inner portion of the coaxial brake cable 997 may be the actuator cable 774 of one or more instances of the braking mechanism 758 shown in FIGS. 7 and 8 (or of another braking mechanism) thereby providing an elevated brake actuator (handle 996) within easy reach of a caregiver.

In the illustrated embodiment, the post is received in a square tube 998 and secured by a threaded rod 999 that can be advanced against the post 994 to trap the post 994 against the opposite wall of the square tube 998.

In other embodiments, a brake actuator may be secured, e.g. by straps, clamps or other methods directly onto a chair (e.g. onto an arm of the chair) carried by a chair caddie according to the present disclosure. For example, where a chair and a chair caddie are intended for sale as a combination (e.g. the combination 600 shown in FIG. 6), the brake actuator may be welded, bolted, adhered or otherwise substantially permanently affixed to an arm of the chair.

As noted above, when used in respect of a surface-engaging roller, the term "longitudinally inboard" means that the surface-engaging roller is positioned between the chair foot receptacle on its respective arm and the pivot position of its respective arm. As also noted above, the term "laterally inboard", when used in respect of surface-engaging rollers on an adjacent pair of arms means that, for the pair of arms, the surface-engaging rollers are positioned between the chair foot receptacles on those arms. In construing the specification and claims, the term "inboard", used without the qualifiers "longitudinally" or "laterally" refers to rollers that are at least one of laterally inboard and longitudinally inboard.

Certain exemplary embodiments have been described by way of example. It will be apparent to persons skilled in the art that a number of variations and modifications can be made without departing from the scope of the claims.

What is claimed is:

1. A chair caddie, comprising:
    a central hub, wherein the central hub comprises four struts;
    four arms, each of the four arms being coupled to and extending outwardly from the central hub and adapted to support a chair leg;
    each arm being supported by a surface-engaging roller;
    wherein the surface-engaging rollers cooperate to elevate the arms and the central hub above a planar surface engaged by the surface-engaging rollers;
    each arm carrying a chair foot receptacle adapted to receive and support a chair foot;
    wherein each roller is positioned inboard of the chair foot receptacle on its respective arm;
    wherein each strut is pivotally coupled to each adjacent strut at respective strut joints so that each strut can pivot relative to each adjacent strut about a respective strut pivot axis, wherein the strut pivot axes are parallel to one another;
    each arm is coupled to the central hub at the strut joints; and
    each strut is of adjustable length whereby the central hub is of adjustable dimension so that the arms are coupled to the central hub at positions that can be adjusted relative to one another.

2. The chair caddie of claim 1, wherein:
    for a first pair of adjacent arms, each roller is positioned longitudinally inboard of the chair foot receptacle on its respective arm; and
    for a second pair of adjacent arms, each roller is positioned laterally inboard of the chair foot receptacle on its respective arm.

3. The chair caddie of claim 2, wherein each strut joint is lockable so as to secure the respective struts and arm thereof in fixed pivotal positions relative to one another.

4. The chair caddie of claim 2, wherein each strut is lockable at a selected length.

5. The chair caddie of claim 4, wherein each strut is incrementally adjustable between a maximum length and a minimum length.

6. The chair caddie of claim 4, wherein each strut is infinitely adjustable between a maximum length and a minimum length.

7. The chair caddie of claim 1, wherein each strut is telescopic.

* * * * *